United States Patent [19]

Lindner et al.

[11] Patent Number: 4,511,695

[45] Date of Patent: Apr. 16, 1985

[54] SOFT POLYMER ALLOYS

[75] Inventors: Christian Lindner; Hans-Eberhard Braese, both of Cologne; Karl-Heinz Ott; Walter Uerdingen, both of Leverkusen, all of Fed. Rep. of Germany

[73] Assignee: Bayer Aktiengesellschaft, Leverkusen, Fed. Rep. of Germany

[21] Appl. No.: 594,282

[22] Filed: Mar. 28, 1984

[30] Foreign Application Priority Data

Apr. 7, 1983 [DE] Fed. Rep. of Germany ....... 3312542

[51] Int. Cl.$^3$ .............................................. C08L 51/04
[52] U.S. Cl. ...................................... 525/80; 525/83; 525/84; 525/85; 525/86; 525/902
[58] Field of Search ...................... 525/80, 83, 84, 85, 525/86, 902

[56] References Cited

U.S. PATENT DOCUMENTS 4,433,102  2/1984  Brandstetter et al. ................. 525/80
4,447,578  5/1984  Kalto et al. ........................... 525/80

FOREIGN PATENT DOCUMENTS 912758   12/1962  United Kingdom ................. 525/80
1077080   7/1967  United Kingdom ................. 525/80
1293791  10/1972  United Kingdom ................. 525/80

*Primary Examiner*—Allan M. Lieberman
*Attorney, Agent, or Firm*—Connolly and Hutz

[57] ABSTRACT

The invention relates to soft polymer alloys based on graft polymers and crosslinked, particulate acrylate copolymers which are suitable for the production of flexible moulding compositions having increased resistance to ageing and better resistance to solvents.

4 Claims, No Drawings

SOFT POLYMER ALLOYS

This invention relates to soft polymer alloys based on graft polymers and crosslinked, particulate acrylate copolymers which are suitable for the production of flexible moulding compositions having increased resistance to ageing and better resistance to solvents.

The elongation, flexibility, processibility and toughness of conventional plastics can be improved by using plasticizers. However, after prolonged use, plasticizers can migrate from the plastic thereby adversely affecting its properties. Certain plastics, for example styrene/acrylonitrile resins, can be mixed with butadiene/acrylonitrile copolymers, resulting in the formation of relatively soft polymer alloys which, unfortunately, are not resistant to ageing because they contain diene polymers. Accordingly, there is a need for polymer alloys which have the properties of plasticized plastics, but which do not contain any plasticizers capable of migration and in which diene rubbers are only present in a very small quantity.

The present invention provides soft polymer alloys of
(A) from 95 to 20% by weight and preferably from 70 to 30% by weight of a graft product of a mixture of from 20 to 40 parts by weight of acrylonitrile and from 80 to 60 parts by weight of styrene, α-methyl styrene, methyl methacrylate or mixtures thereof on a particulate, highly crosslinked diene or alkyl acrylate rubber having an average particle diameter ($d_{50}$) of from 0.1 to 2.0 μm, the total rubber content amounting to between 20 and 50% by weight, and
(B) from 5 to 80% by weight, and preferably from 30 to 70% by weight, of a particulate, crosslinked rubber-like copolymer of an alkyl acrylate containing (based on copolymer) from 20 to 40% by weight of acrylonitrile and/or methyl methacrylate and having an average particle diameter ($d_{50}$) of from 0.05 to 0.6 μm, a gel content of from 80 to 99% by weight (as measured in dimethyl formamide at 25° C.) and a degree of swelling of from 10 to 40 (as measured in dimethyl formamide at 25° C.).

Particularly preferred copolymers (B) are obtained by the radical emulsion polymerization of mixtures of from 20 to 40% by weight, and preferably from 25 to 35% by weight, of acrylonitrile and from 80 to 40% by weight, and preferably from 75 to 65% by weight, of alkyl acrylate containing 8 carbon atoms in the alkyl moiety using up to 1% by weight, based on the acrylonitrile-alkyl acrylate mixture, of a polyfunctional allyl or vinyl compound as crosslinking agent.

Preferred graft products (A) are particulate, highly crosslinked alkyl acrylate rubbers onto which styrene/acrylonitrile mixtures have been grafted.

Copolymers (B) may be produced by the radical emulsion polymerization of corresponding monomer mixtures.

Preferred crosslinking agents are triallyl cyanurate, triallyl isocyanurate, vinyl ethers of polyfunctional alcohols, vinyl esters of polyfunctional carboxylic acids, polyester glycol polyacrylates and polyether glycol polyacrylates.

The graft products (A) are known polymers which may be produced by graft polymerization in emulsion, suspension or solution. The graft base used may be a diene rubber, more particularly a polybutadiene, butadiene-acrylonitrile or butadiene-styrene copolymer. Acrylate rubbers having a crosslinked, particulate structure, preferably with average particle diameters ($d_{50}$) of from 0.2 to 0.6 μm, are particularly suitable.

Particular preference is attributed to particulate graft polymers having a core of a highly crosslinked diene rubber, a first shell of a crosslinked acrylate rubber and a second shell of a polymer or copolymer of resin-forming monomers, for example styrene and acrylonitrile.

These graft polymers are described in German Offenlegungsschrift No. 30 06 804.

The graft products (A) contain from 20 to 50% by weight of rubber, more particularly from 20 to 40% by weight, and they have gel contents, as measured in dimethyl formamide at 25° C., of from 30 to 85% by weight and more particularly from 40 to 70% by weight. Suitable graft monomers are styrene, α-methyl styrene, acrylonitrile, methyl methacrylate or mixtures thereof, particularly mixtures of acrylonitrile and, optionally, relatively small quantities of methyl methacrylate with styrene which at least contain 20% by weight of acrylonitrile. The graft products (A) are produced by polymerizing these monomers in the presence of the particulate diene or acrylate rubbers.

The alkyl acrylate copolymers (B) may be produced by the radical emulsion polymerization at temperatures of from 30° to 90° C., and preferably at temperatures of from 40° to 85° C., of monomer mixtures of from 20 to 40% by weight of acrylonitrile and/or methyl methacrylate and from 80 to 60% by weight of alkyl acrylate containing up to 10 carbon atoms in the alkyl group, high degrees of crosslinking of the copolymers and a high degree of swelling having to be guaranteed. The copolymers (B) have a gel content of from 80 to 99% by weight, more particularly from 90 to 99% by weight, and degrees of swelling of from 10 to 40 and more particularly from 15 to 25. A high degree of crosslinking (expressed by the gel content) for a relatively low crosslinking density (expressed by the swelling index) can be obtained, for example, by using up to 1% by weight of polyfunctional copolymerizable allyl compounds where production is carried out by emulsion polymerization. Suitable polyfunctional copolymerizable allyl compounds are triallyl compounds, such as triallyl (iso) cyanurates.

The polymer alloys according to the invention may be obtained by mixing the components (A) and (B) with one another at relatively high temperatures, more particularly at temperatures in the range from 100° to 250° C., for example in kneaders, on roll stands or in screw extruders. In cases where (A) and (B) accumulate in the form of an emulsion, suspension or solution, they may be mixed in that form and worked up together.

The polymer alloys may contain standard additives, such as oxidation inhibitors, antiagers, lubricants, fillers, pigments and antistatic agents in the usual quantities.

The polymer alloys according to the invention are relatively soft, flexible, thermoplastic moulding compositions which show favourable flow properties when processed by extrusion, calendering and injection moulding. Alloys of grafted and ungrafted alkyl acrylate copolymers in particular show improved ageing behaviour, considerably increased resistance to solvents and more favourable rheological properties for thermoplastic processing by comparison with corresponding mixtures containing diene/acrylonitrile copolymers.

The polymer alloys according to the invention may be used, for example, in motor vehicles as lining films, injection-moulded consoles and other non-load-bearing structural components for applications where plasticizer migration is undesirable. The polymer alloys are particularly suitable for the production of laminating films. Films such as these may be laminated, for example, onto a layer of ABS or an ABS-polyvinyl chloride mixture to form soft, light-stable surfaces suitable for embossing or surfaces showing improved solvent resistance. The polymer alloys are also suitable for coextrusion with photosensitive polymers. Thus, it is possible to produce "sandwich" panels having a core of ABS and an outer layer or skin of the polymer alloys according to the invention. Materials such as these are suitable for the production of tubes, profiles, hollow bodies and facings.

The gel contents and swelling indices were determined in dimethyl formamide at 25° C. (cf. M. Hoffmann et al., Polymeranalytik II, Georg Thieme Verlag, Stuttgart 1977). The particle sizes are average particle diameters $d_{50}$ (cf. "Ultrazentrifugenmessungen" by W. Scholtan et al., Kolloidz. u. Z.Polymers 250 (1972) 783-796).

EXAMPLES

I. Polymers (A)

(1) An ABS graft polymer obtained by polymerizing 70 parts by weight of a styrene/acrylonitrile mixture (ratio by weight 66:34) in the presence of 30 parts by weight (based on solids) of a polybutadiene latex having an average particle diameter of 0.4 μm.

(2) An AAS-graft polymer obtained by polymerizing 70 parts by weight of a mixture of styrene and acrylonitrile (ratio by weight 66:34) in the presence of 30 parts by weight (based on solids) of a highly crosslinked poly-n-butyl acrylate latex having an average particle diameter of 0.45 μm.

The product was produced in accordance with German Offenlegungsschrift No. 30 06 804.

II. Copolymers (B)

(1) An acrylonitrile-butadiene rubber which has an average particle diameter of 0.15 μm and an acrylonitrile content of 30% by weight, a gel content of 90% by weight and a swelling index of 19.

(2) Alkyl acrylate copolymer rubber 32.7 parts by weight of water, 0.095 part by weight of the sodium salt of a $C_9$-$C_{14}$-alkyl sulfonic acid and 5.7 parts by weight of a mixture of 69.69% by weight of n-butyl acrylate, 0.442% by weight of triallyl cyanurate and 29.86% by weight of acrylonitrile are introduced into a reactor. The polymerization reaction is initiated at 65° to 67° C. by the addition of 0.095 part by weight of potassium persulfate in 2.4 parts by weight of water. The following solutions are then introduced over a period of 5 hours at the above-mentioned temperature:

Solution (a) 69.633 parts by weight of the above-mentioned monomer mixture

Solution (b) 85 parts by weight of water plus 1.5 parts by weight of the sodium salt of a $C_9$-$C_{14}$-alkyl sulfonic acid.

The reaction mixture is then polymerized for 4 hours at 67° C.

III. Properties of the alloys according to the invention

After stabilization with 1.2 parts of phenolic oxidation inhibitors per 100 parts of polymer mixture, the following alloys were produced (by rolling a powder-form material produced by the co-precipitation of corresponding latex mixtures for 10 minutes at 175° C.):

| | | |
|---|---|---|
| (1) | 50 parts of graft polymer I[1]<br>50 parts of rubber II[1] | Comparison |
| (2) | 50 parts of graft polymer I[1]<br>50 parts of rubber II[2] | |
| (3) | 50 parts of graft polymer I[2]<br>50 parts of rubber II[2] | |

Resistance of chemicals: a compression-moulded panel is stored for 24 h at 23° C., after which its change in weight in grams is measured:

| Product | Medium Petrol | Toluene/isooctane 50 | Trichloroethylene 50 |
|---|---|---|---|
| III1) | +0.096 | +0.537 | panel disintegrates |
| III2) | +0.028 | +0.230 | +0.949 |
| III3) | +0.039 | +0.391 | +1.130 |

As can be seen from the Table, the moulding compositions according to the invention are far less seriously affected by the solvents.

Mechanical properties

See following Tables.

| Product | Ball indentation hardness DIN 53456 (MPa) 30″ | Notched impact strength DIN 53453 (kg/m²), 23° C. | Elongation DIN 53455 $\epsilon_R$ (%) | Tensile strength DIN 53455 $\sigma_R$ (MPA) |
|---|---|---|---|---|
| III1) | 7.8 | 20.4 | 60 | 6.6 |
| III3) | 26.5 | 27.6 | 192 | 27.8 |

| Product | Dimensional stability under heat VicatA (DIN 534); | VicatB (DIN 53460) | Elongation DIN 53455, $\epsilon_R$ (%) | Shore Hardness D |
|---|---|---|---|---|
| III1) | 67° C. | too soft | 60 | 36 |
| III2) | 99° C. | 46° C. | 176 | 63 |
| III3) | 93° C. | 43° C. | 112 | 61 |

As can be seen from the tables, the molding compositions according to the invention show improved dimensional stability under heat, greater toughness and higher elongation by comparison with compositions containing NBR. When the moulding compositions are exposed to light, their ageing (deterioration in mechanical values) is improved in the following order III2)<III2-)<III3).

We claim:

1. A soft polymer alloy comprising
   (A) from 95 to 20% by weight of a graft product of a mixture of from 20 to 40 parts by weight of acrylonitrile and from 80 to 60 parts by weight of styrene, α-methyl styrene, methyl methacrylate or mixtures thereof on a particulate, highly crosslinked diene or alkyl acrylate rubber having an average particle diameter, $d_{50}$, of from 0.1 to 2.0 μm, the total rubber content amounting to between 20 and 50% by weight, and (B) from 5 to 80% by weight of a particulate, cross-linked rubber-like copolymer of an alkyl acrylate containing from 20 to 40% by weight of acrylonitrile, methyl methacrylate or both based on the weight of the copolymer and having an average particle diameter, $d_{50}$, of from 0.05 to 0.6 μm, a gel content of from 80 to 99% by weight, as measured in dimethyl formamide at 25° C., and a degree of swelling of from 10 to 40, as measured in dimethyl formamide at 25° C.

2. The soft polymer alloy of claim 1 wherein the soft polymer alloy comprises from 70 to 30% by weight of (A).

3. The soft polymer alloy of claim 1 wherein the soft polymer alloy comprises from 30 to 70% by weight of (B).

4. The soft polymer alloy of claim 2 wherein the soft polymer alloy comprises from 30 to 70% by weight of (B).

* * * * *